April 10, 1934.  J. BRUECKL  1,954,376
SEAT COVERING DEVICE
Filed March 1, 1933
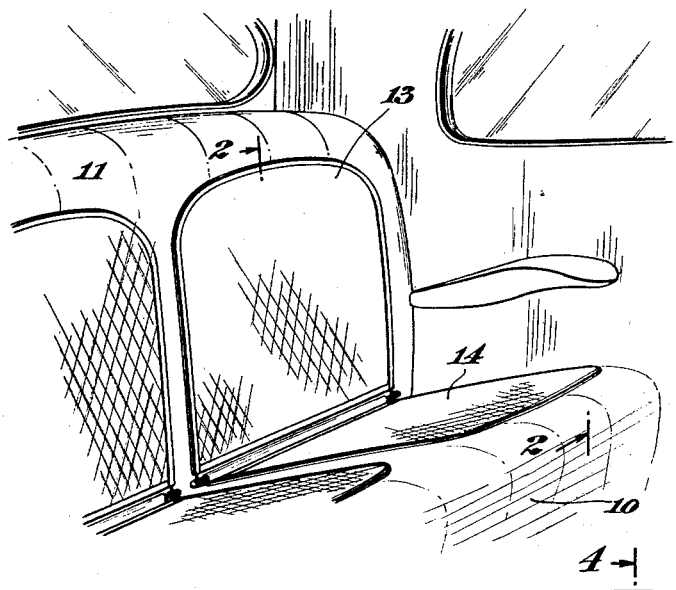
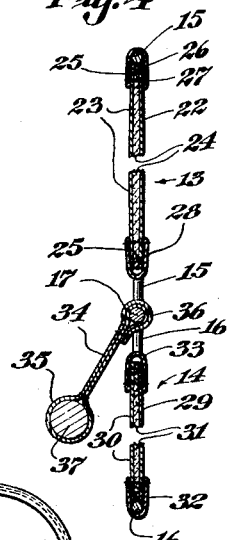
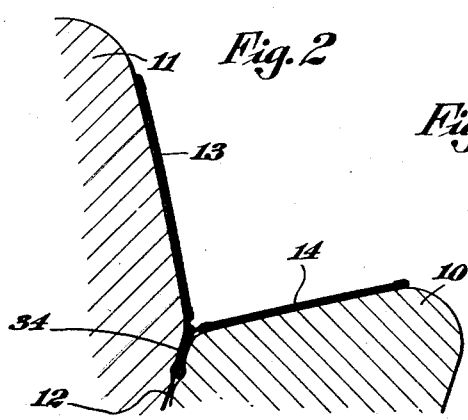
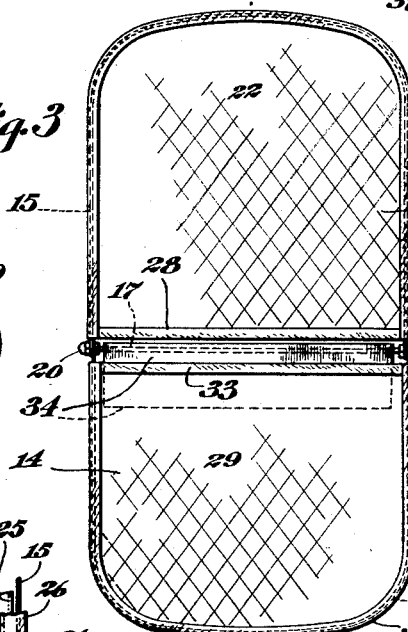
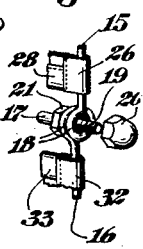
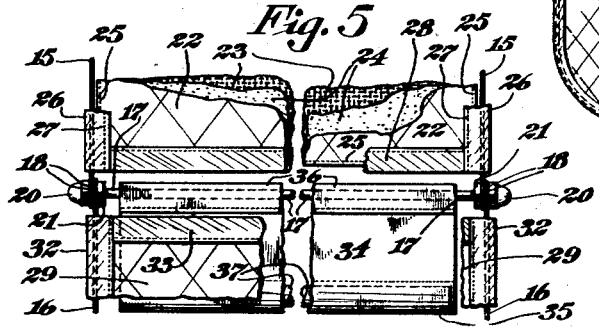
INVENTOR,
John Brueckl,
BY Frederick Breitenfeld
ATTORNEY Patented Apr. 10, 1934

1,954,376

UNITED STATES PATENT OFFICE 1,954,376

SEAT COVERING DEVICE

John Brueckl, Union City, N. J.

Application March 1, 1933, Serial No. 659,097

2 Claims. (Cl. 155—182)

My present invention relates generally to seat covers, and has particular reference to an improved device for protectively covering the seat and seat-back of a cushioned automobile seat or the like.

While my invention is primarily directed toward the protective covering of automobile seats, and while I have herein illustrated and shall hereinafter describe my invention as the same may be embodied in a device for use in an automobile, nevertheless it will be understood that many phases of my invention are not necessarily restricted to such a specific application.

A general object of my invention is to provide a simple and inexpensive, yet highly efficient, protective covering device which may be removably and adjustably applied to seats of the character mentioned. Briefly, my invention is of the type which involves two associated sections; one being a seat section adapted to overlie the seat; the other being a back section adapted to cover the seat-back.

A particular object of my invention is to provide a device which is reversible, i. e., wherein each of the two sections is provided with opposite surfaces, either of which may be exposed for use. A particular feature of my invention lies in the provision of a web of covering material which has opposite exposed surfaces of different characteristics. One surface, for example, may advantageously be composed of a woven paper matting or the like, desirable for use in hot weather; while the other surface may, for example, be composed of a darker woven fabric of more ornamental characteristics.

Another object of my invention is to provide a device which is so constructed and arranged that it may be adjusted into a variety of positions adapted to suit the differing requirements which different seats and cushions may call for; and to provide a manually controllable means for locking or securing the several elements of my device into the relationship desired. A feature of my invention lies in hinging the two sections of the device by means of a pivot rod arranged transversely between them, and in providing a manually controllable means cooperating with the pivot rod for permitting a simple adjustment thereof to clamp the sections of the device in substantially immovable relationship.

Another object of my invention is to provide an arrangement whereby the device may be securely retained in desired positional relationship to the seat being covered, without likelihood or danger of shifting or sliding out of its desired location. To accomplish this end, my invention embodies an anchoring tab of novel characteristics which is adapted to be wedged into the crevice between the seat and the seat-back.

A particular feature of my invention lies in providing an anchoring tab, in conjunction with a means for locking the seat sections in desired relationship, while at the same time permitting the entire device to be reversible and removable.

I achieve the foregoing objects, and such other objects as may hereinafter appear or be pointed out, in the manner illustratively exemplified in the accompanying drawing, wherein—

Figure 1 is a perspective view of a pair of protective devices of the present character shown, by way of example, in association with the rear cushioned seat of an automobile;

Figure 2 is a side cross-sectional view taken substantially along the line 2—2 of Figure 1;

Figure 3 is a plan view of the present device with the two sections shown in alignment;

Figure 4 is an enlarged cross-sectional view, partly broken away, taken substantially along the line 4—4 of Figure 3;

Figure 5 is a fragmentary view taken in the same direction as Figure 4, showing certain details of construction; and Figure 6 is a fragmentary perspective view showing the manner in which the frames are associated with the pivot rod.

In Figure 1, the seat to be protectively covered consists of the cushioned seat element 10 and the cushioned seat-back 11. These elements are constructed in a manner whereby a crevice 12 is provided between them at the rear of the seat.

The present device is composed, generally, of the rear or seat-back section 13 and the forward or seat-cover section 14. These sections are constructed, in accordance with my present invention, in the manner most clearly illustrated in Figures 3-5.

Briefly, the device is composed of two opposed, U-shaped wire frames 15 and 16, the free ends of which are loosely engaged or looped around a common pivot rod 17 arranged transversely between the frames and, preferably, having a circular cross-section. The frames are composed of wire or the like of relatively small cross-section; and it is convenient to form the ends of the frames, as indicated at 18, into loops or eyes of a size which enables them to be slipped loosely over the opposite ends of the rods 17.

In accordance with my present invention, the opposite ends of the rods 17 are threaded, as at 19, and a threaded, manually controllable clamping nut 20 is removably applicable to each end so as to engage with the threads 19. In the embodiment illustrated, a clamping of each nut 20 will clamp the looped ends 18 of the frames 15 and 16 into locked relationship with the pivot rod 17, and hence into locked relationship to each other. This is conveniently accomplished by mounting a fixed nut 21, or its equivalent, on the rod 17 near its opposite ends, so that the frame ends 18 are adapted to be clamped together between this nut and the locking nut 20.

Each frame carries a web of covering material which, in accordance with my present invention, embodies opposite surfaces of different characteristics. Preferably, each web is composed of a two-ply construction, whereby one layer of material is exposed in one direction and another layer of material is exposed in the opposite direction. In the form herein illustrated, I have shown a two-ply construction with a padding layer of relatively soft material between the two plies. Referring to Figures 4 and 5, for example, I first assemble the two different outer plies 22 and 23, with the padding layer 24 between them, by stitching them together around the edges by the row of stitches 25. This assembly is shaped so that it will fit snugly within the confines of the corresponding U-shaped frame 15. A binding 26 is then applied around the entire periphery of the frame 15, and is secured in position, so as to enclose the frame 15 and the stitched edges of the web, and a row of stitching 27 holds this binding in position. Another similar binding 28 is applied over the inner edge of the web, and it is to be observed that there is no wire reinforcement or frame along this edge.

The same general steps are then carried out in connection with the other section of the device, the opposite plies 29 and 30, with the padding layer 31 between them, being held in association with the frame 16 by means of the binding 32 and an additional binding 33 extending along the free inner edge of the web.

The anchoring tab of my present invention consists of a substantially rectangular piece of fabric 34 having the tubular channels 35 and 36 along two opposite edges. A rigidifying member or rod 37, preferably of wood is loosely inserted within the channel 35, and the other channel 36 is loosely engaged around the midportion of the pivot rod 17.

The advantageous characteristics of my present device will be apparent from a description of the manner in which it is to be used. Assuming that the outer surfaces 22 and 29 are desired to be exposed for use, the nuts 20 are slightly released and the frames are adjusted into the relationship of Figures 1 and 2. When the desired angular relationship has been attained, depending upon the angularity of the particular seat which is to be protected, the nuts 20 are tightened, thereby clamping the frame ends into locked relationship to the rod 17 and hence into locked relationship to each other. A tightening of the nuts 20 is expeditiously accomplished, by hand, and does not require any complicated or annoying manipulations, nor the use of tools. The anchoring tab 34 is disposed on the obtuse or rear side of the device, and is then wedged into the crevice 12, as indicated in Figure 2. The device is then ready for use, and it will remain in the relationship indicated in Figures 1 and 2 until it is deliberately removed or adjusted. One of the principal advantages of my present construction lies in the fact that the back section will not collapse forwardly when the occupant of the seat rises, since it is held in predetermined angular relationship to the seat section by means of the interlocking engagement of the nuts 20 and the frames 15 and 16.

Another desirable characteristic resides in the fact that the user may rest upon the present device in absolute comfort, there being no relatively rigid or bulky, unyielding reinforcement elements or frames against which his body would press. This advantage is directly due to the present construction whereby the only relatively rigid elements are the two U-shaped frames and the medial pivot rod. The U-shaped frames extend only around the sides and ends of the device, leaving the inner edges of the webs free and unreinforced; and the pivot rod 17 positions itself well to the rear, as shown in Figure 2, so that the occupant of the seat never comes in contact with this rod.

When it is desired to expose the opposite pair of outer surfaces for use, it is merely necessary to release the nuts 20, swing the frames into the opposite angularity, adjust the anchoring tab to the opposite side of the device, and then retighten the nuts 20. The adjustability of the tab from one side to the other is made possible by the absence of rigid frame elements along the inner edges of the webs. In other words, upon viewing Figure 4, it is relatively a simple matter to manipulate the tab 34 through the space between the rod 17 and the binding 33, or through the space between the rod 17 and the binding 28, thereby to position the tab 34 on the right-hand side of the two sections. This manipulation is feasible and simple because of the free, yieldable, and reinforced character of the inner edges that terminate in the bindings 28 and 33.

In reversed position, the device is used as hereinbefore described, and assumes again the position shown in Figures 1 and 2, the seat and seatback sections beind held in predetermined angular relationship in the same manner as before by merely tightening the nuts 20.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention, and illustrated its use, what I claim as new and desire to secure by Letters Patent is—

1. A reversible seat cover comprising a pair of substantially U-shaped wire frames having their free ends provided with eyes, a web of covering material secured to each frame and terminating in a loose edge short of the free ends, a pivot rod loosely engaged through the frame eyes and threaded at each end, an abutment on said rod adjacent each end on the inner side of the frame eyes, nuts threaded on the pivot rod ends for clamping the frame eyes together against the abutments, and an anchoring tab on said rod and freely movable thereover for passage between the loose edges of the frame webs.

2. A reversible seat cover comprising a seat cover section, a seat back cover section, a pivot rod connecting said sections in hinged relation, said sections having webs terminating in loose edges in spaced parallel relation with respect to said rod, and a seat-crevice-engageable flexible anchoring tab loosely engaged over said rod for passage between the loose edges of the section webs, and said tab being movable axially over said rod.

JOHN BRUECKL.